Aug. 9, 1938.  J. VOGEL  2,126,519

METHOD OF FORMING INTERSECTIONS FOR JOINING STRUCTURAL MEMBERS

Filed Dec. 17, 1936

INVENTOR
Julius Vogel.
BY Nelson C. Cuddeback
ATTORNEY

Patented Aug. 9, 1938

2,126,519

UNITED STATES PATENT OFFICE 2,126,519

METHOD OF FORMING INTERSECTIONS FOR JOINING STRUCTURAL MEMBERS

Julius Vogel, Chicago, Ill.

Application December 17, 1936, Serial No. 116,265

8 Claims. (Cl. 29—148.2)

This invention relates to a method of forming intersections for joining structural members and more particularly to a method of forming intersections or notches for joining structural tubing.

The main object of the invention is to provide a method of forming notches in structural tubing so that structural tubing may be joined together by welding, especially for the forming of pipe railing without the use of pipe coupling members.

Another object of the invention is to provide a method of shearing segmental portions from and leaving arcuate notches in pipes corresponding to the intersection of the surfaces of the pipes to be joined, and in such a manner as to provide a bright or clean surface for welding, each surface being less than a semicircle to provide for leaving a thick portion so that as the pipes are welded together the edges to be welded will not be burnt away.

Still another object of the invention is to provide a method of notching the pipe so that the pipe may be joined at the intersection of other pipes.

Other and further objects and advantages of the invention will appear as the description progresses.

The method herein described for forming notches in structural tubing, such as round or square tubes, consists first, in squaring the ends of the tube and then notching the tubing forming a notch conforming to the intersection of the tubes at whatever angle they are joined together, and also shearing the tubing so that it has a sheared surface corresponding to the outer perimeter or circumference of the tubing to be joined to the notched tube in order that it will lie flat in the notches forming the line of the intersection.

One preferred form of device which achieves desirable results in forming notches in structural tubing is shown in the accompanying drawing in which.

Figure 1:
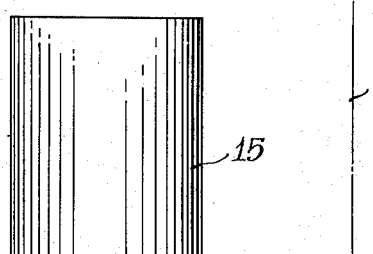
Figure 1 shows a punch fixture comprising a punch and die mounted in the ram and bolster of a punch press; and showing a portion of a structural tube and the die in section.

In Figure 1 a ram 10, shown diagrammatically, of a punch press supports a punch 11 of a fixture 12. The punch fixture 12 comprises a die member 13 mounted in a bolster 14 of the punch press, and the bolster also being shown diagrammatically.

Figure 2:
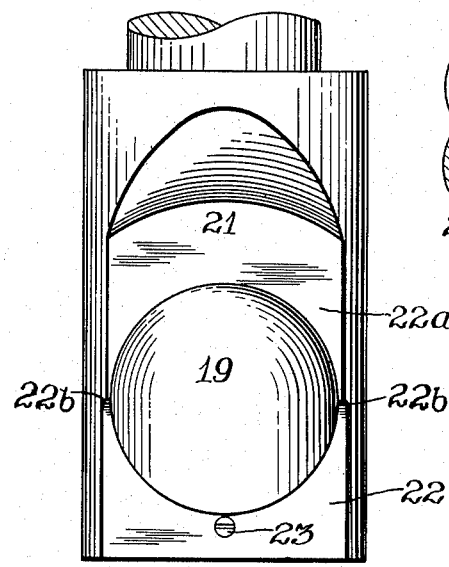
Figure 2 is a view of the punch looking at the notching portion.

The punch 11, as best shown in Figures 1 and 2, has a shank portion 15 which is secured in the ram of the punch press in the usual manner. The punch 11 is formed from a cylindrical bar which is equal in diameter to the outside diameter of a structural tube 16, as shown in Figure 1, which is to be notched.

Figure 3:
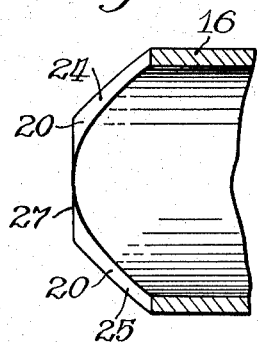
Figure 3 is a section of a piece of pipe which has been notched showing the surface of the notch.

The punch 11, as set up in the punch, as shown in Figure 1, is in alignment with a bored portion 17 of the die 13 to guide the punch in the die, and also to form a shearing surface for notching the structural tube 16. The die 13 is formed with a groove or recess 18 shaped to receive the tubular member 16. As best shown in Figures 1 and 2, the punch 11 has a shear or punch portion 19 shaped to shear the structural tube 16, as best shown in Figure 3. The shearing portion 19 is equal substantially in diameter to the inner diameter of the heaviest gage tubing to be sheared so that the tube 16 may be positioned, as shown in Figure 1. The tube 16 is inclined at an angle by having the groove 18 formed at an inclination to the horizontal so that the angle between the axis of the punch and the axis of the pipe or tube is greater than 90°. This acts to provide the necessary clearance for placing the tube in the punch fixture and also acts to shear the notch, as shown at 20 in Figure 3. The punch 11 is cut away as at 21 to provide clearance for the pipe as the punch is operated to shear out a section of the pipe. The punch 11 has a gage portion 22 at right angles to the groove 18 so that the pipe to be notched abuts the surface 22 and the shear portion 22a which also acts to shear the tube as shown at 20, in order to gage the depth of the notch which is cut or sheared from the pipe. In addition an additional gage surface is provided by the surface 22a for gauging shorter notches when necessary by abutting the pipe against this surface and not inclining the pipe in the groove or recess 18. As it is necessary at times to notch pipes or tubes of the same outside diameter but of different inside diameters because pipes or tubes come in standard, heavy or extra heavy dimensions, it is necessary to provide an adjustable gage means 23 in the form of a headless set screw. It is obvious that this additional adjusting means 23 may be provided in other forms. A pair of cutting portions 22b is also provided on the punch 11, one portion being disposed at each side of the shear or punch portion 19. These portions insure proper cutting of the sides of the tubular member, and are fairly sharp so as to leave substantially straight edges on that portion of the end of the tubular member that is left unsheared, and to provide clean surfaces in the cut portions.

Figure 4:
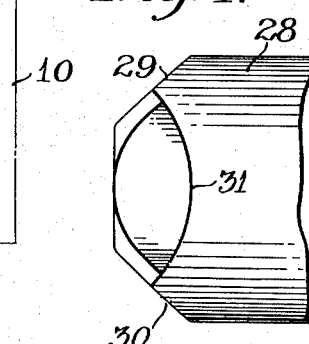
Figure 4 is an end of a structural tube which is notched so that three structural tubes may be joined at right angles to each other.
Figure 5:
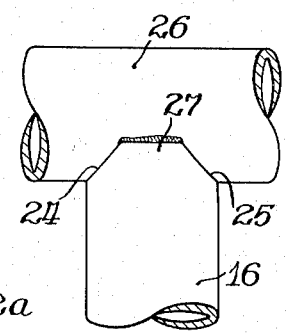
Figure 5 shows one of the tubes which has been notched, as shown in Figure 3, joined to another tube at right angles thereto; and, Figure 6 shows three tubes joined at right angles to one another with one of the tubes formed, as shown in Figure 4.

In Figures 3, 4, 5 and 6 are shown examples of the work done by the punch fixture. In Figure 3 is shown the notched tubing which is joined, as shown in Figure 5. In notching the tube or pipe 16, as shown in Figure 3, the pipe 16 is placed in the punch fixture, as shown in Figure 1 with the pipe inclined, as shown. The press is tripped and the shearing portion 13 shears a notch 24. The pipe is then turned through 180° and another notch 25 is sheared similar to the notch 24. Each of the notches 24 and 25 has a sheared surface 20 conforming to the surface of the pipe to which it is to be joined. With the surface 20, as shown in Figure 3, the pipe may be abutted to another tube 26 and the tubes 16 and 26 welded together, as shown in Figure 5, to make a T-joint.

In Figures 3 and 5, the pipe 16 is sheared in such a manner as to leave a thick portion 27 in order to weld the two pipes together without burning the edge of the pipe 16 at 27 because of its thickness. If necessary, the two pipes may be joined along the intersections formed by the notches 24 and 25. It is, therefore, apparent that structural tubing may be readily joined together by this method by simply notching a pipe to correspond to its intersection with another similar pipe and then welding the two together without the use of pipe couplings, therefore, providing large savings over the necessary threading of the pipe, the use of the couplings, and the necessary labor in threading the pipes to the couplings.

Figure 6:
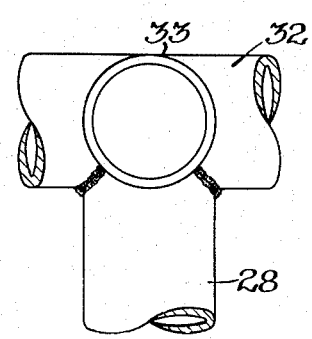

Figure 4 shows the intersections formed by the same or a similar fixture to provide the joint, as shown in Figure 6, where three pipes are joined together. As shown in Figure 4, a pipe 28 is notched as the pipe 16, as shown in Figure 3, forming notches 29 and 30. Then the pipe is placed so that the notches 29 and 30 are at right angles to the punch 11 and the notch 31 is formed.

Figure 6 shows three pipes 28, 32 and 33 joined at right angles to each other.

In joining the pipes, as shown in Figure 6, the pipe 33 is first notched as the pipe 16 is notched in Figure 3, and the pipe 33 is welded to the pipe 32, as shown in Figure 5. The pipe 28, having been notched, as shown in Figure 4, is then positioned, as shown in Figure 6, and welded to the pipe 32. If necessary two or three pipes may be welded along their intersections. It is to be understood that wherever the term welded is used it is to be considered generic as to brazing, soldering, gas or electric welding.

The method of notching the pipe in order to join them together in structural forms is used primarily in forming fences and other similar constructions; however, it is obvious that the same construction may be used in joining pipes which carry fluids without departing from the scope of the invention. It is also apparent the same method of notching pipe may be used in joining pipes which are at an acute or an obtuse angle to one another. With this method of shearing or notching pipe, it is apparent that the notches are so formed as to conform to the circumference of the pipe or other member to which the pipe is to be joined and also provides a thickened portion for welding. In addition the shearing of the pipe leaves a clean and bright surface which is necessary for a good weld, and also leaves an opening at the intersection because of the inclination of the groove to allow for the better flow of the welding material to form a better weld.

From the foregoing description, it will be obvious that the invention is not limited in use to notching cylindrical or tubular pipe, but is readily applicable in notching square or other shapes of structural tubing.

While the construction above described exemplifies one preferred form of the invention, it will be obvious to those skilled in the art that certain modifications are possible without departing from the scope of the invention as defined in the following claims.

What is claimed as new is:

1. The method of uniting an end of one tubular member to an intermediate portion of a second tubular member comprising shearing two diametrically opposed sections from an end of the first member leaving a pair of concentric curved edges each formed about an imaginary center beyond said end of the member and leaving a pair of diametrically opposed unsheared portions on the member between the curved edges terminating in unsheared edges coincident with the remainder of said end, placing the members together with the second member substantially fitting the aforesaid curved edges with the aforesaid unsheared portions overlying opposite portions of said second member, and welding the two members together along at least portions of the edges of said unsheared portions.

2. The method of uniting an end of each of two tubular members to an intermediate portion of a third tubular member comprising shearing two diametrically opposed sections from the first member leaving a pair of curved edges substantially conforming to the surface of the third member and leaving a pair of diametrically opposed unsheared portions terminating in unsheared edges coincident with the remainder of said end, duplicating said operation on the second member and further shearing a section from one of the unsheared portions leaving a third curved edge on the second member substantially conforming to the surface of the first member, placing the first and third members together with the third member substantially fitting the curved edges of the first member, placing the second member in position on the aforesaid two members with the third member fitting the diametrically opposed curved edges of the second member and a surface of the first member adjacent an unsheared portion fitting the aforesaid third curved edge of the second member, and securing the members together.

3. The method of uniting an end of one tubular member to an intermediate portion of a second tubular member comprising shearing two diametrically opposed sections from an end of the first member leaving a pair of curved edges disposed at acute angles with the axis of the member and leaving a pair of diametrically opposed unsheared portions on the member between the aforesaid edges, placing the members together with the second member substantially fitting aforesaid curved edges with the aforesaid unsheared portions overlying opposite portions of said second member, and welding the two members together along at least portions of the edges of said unsheared portions.

4. The method of uniting an end of each of two tubular members to an intermediate portion of a third tubular member comprising shearing two diametrically opposed sections from the first member leaving a pair of curved edges at acute angles with the axis of the member and substantially conforming to the surface of the third member and leaving a pair of diametrically opposed unsheared portions, duplicating said operation on the second member and further shearing a section from one of the unsheared portions leaving a third curved edge on the second member substantially conforming to the surface of the first member, placing the first and third members together with the third member substantially fitting the curved edges of the first member, placing the second member in position on the aforesaid two members with the third member fitting the diametrically opposed curved edges of the second member and a surface of the first member adjacent an unsheared portion fitting the aforesaid third curved edge of the second member, and securing the members together.

5. The method of uniting an end of one tubular member to an intermediate portion of a second tubular member to form a T joint comprising squaring an end of the first member, shearing two diametrically opposed sections from said end leaving a pair of curved edges substantially conforming to a portion of the surface of the second member and formed about an imaginary center beyond said end and leaving a pair of unsheared portions between the curved edges terminating in substantially flat edges coincident with the remainder of the squared end, placing the members together with the second member fitting the curved edges with the aforesaid unsheared portions overlying opposite portions of said second member and terminating short of a plane passed through the axis of the second member perpendicular to the axis of the first member, and securing the members together.

6. The method of uniting an end of one tubular member to an intermediate portion of a second tubular member to form a T joint comprising squaring an end of the first member, shearing two diametrically opposed sections from said end leaving a pair of curved edges substantially conforming to a portion of the surface of the second member and formed about an imaginary center beyond said end and leaving a pair of unsheared portions between the curved edges terminating in substantially flat edges of substantially the same thickness as the member and coincident with the remainder of the squared end, placing the members together with the second member fitting the curved edges with the aforesaid unsheared portions overlying opposite portions of said second member and terminating short of a plane passed through the axis of the second member perpendicular to the axis of the first member, and welding the members together along at least said flat edges.

7. The method of uniting an end of each of two tubular members to a portion of a third tubular member comprising squaring an end of the first member, shearing two diametrically opposed sections from said end leaving a pair of curved edges substantially conforming to a portion of the surface of the third member and formed about an imaginary center beyond said end and leaving a pair of unsheared portions between the curved edges terminating in substantially flat edges coincident with the remainder of the squared end, duplicating said operation on the second member and further shearing a section from one of the unsheared portions leaving a third curved edge on the second member substantially conforming to the surface of the first member, placing the second member in position on the aforesaid two members with the third member fitting the diametrically opposed curved edges of the second member and a surface of the first member adjacent an unsheared portion fitting the aforesaid third curved edge of the second member, and securing the members together.

8. The method of uniting an end of each of two tubular members to a portion of a third tubular member comprising squaring an end of the first member, shearing two diametrically opposed sections from said end leaving a pair of curved edges substantially conforming to a portion of the surface of the third member and formed about an imaginary center beyond said end leaving a pair of unsheared portions between the curved edges terminating in substantially flat edges of substantially the same thickness as the member and coincident with the remainder of the squared end, duplicating said operation on the second member and further shearing a section from one of the unsheared portions leaving a third curved edge on the second member substantially conforming to the surface of the first member, placing the second member in position on the aforesaid two members with the third member fitting the diametrically opposed curved edges of the second member and a surface of the first member adjacent an unsheared portion fitting the aforesaid third curved edge of the second member, and securing the members together.

JULIUS VOGEL.